Patented Aug. 11, 1953

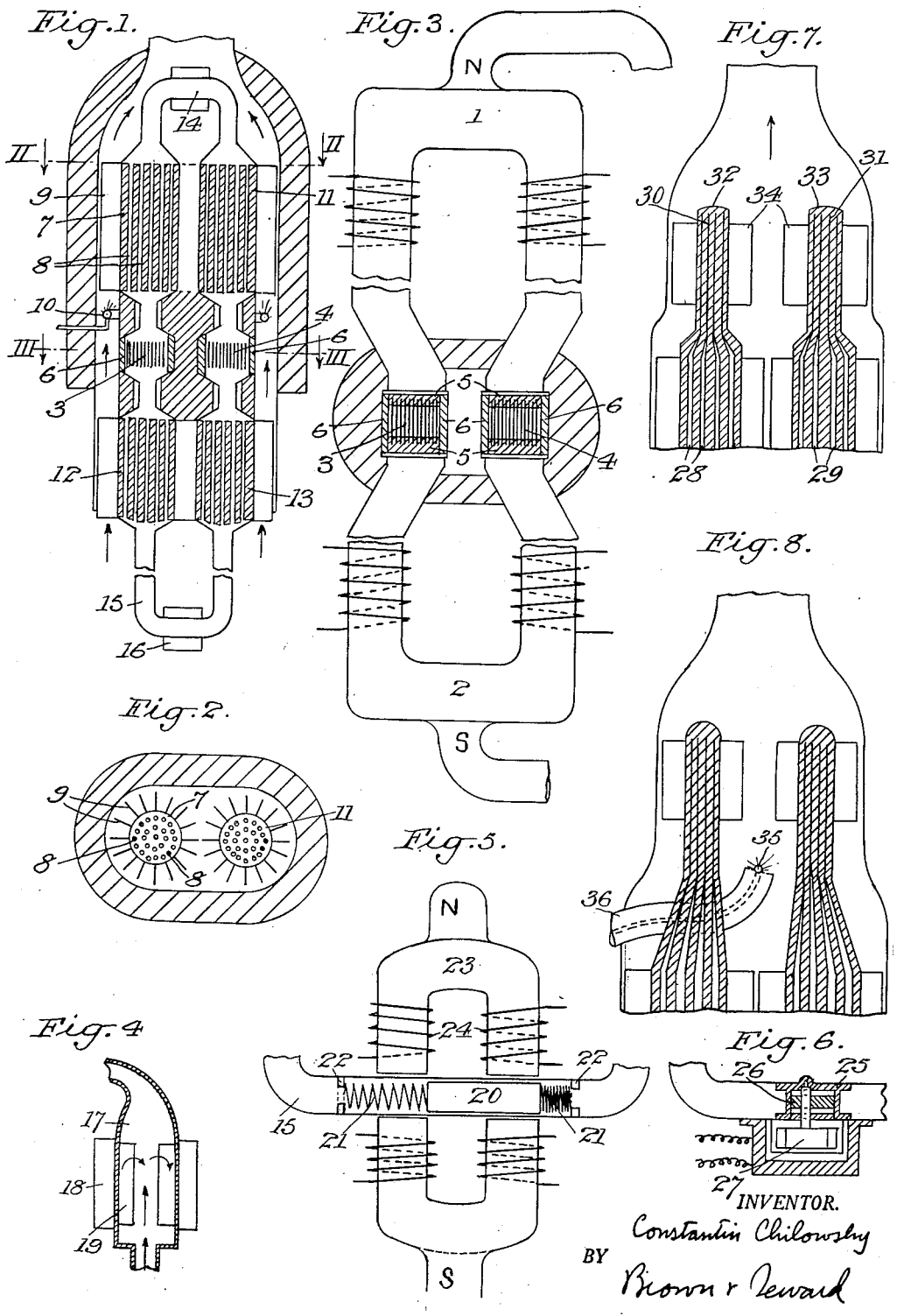

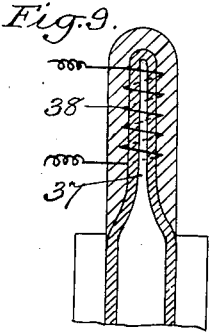
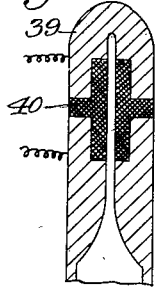
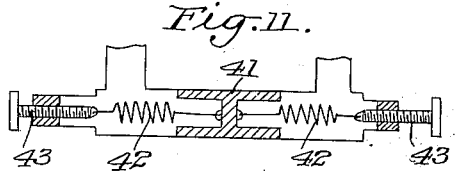
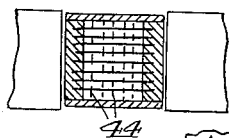
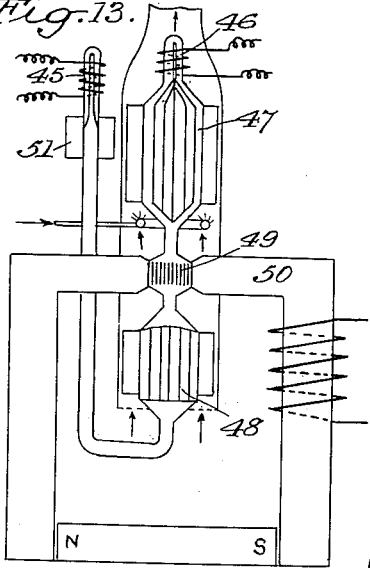
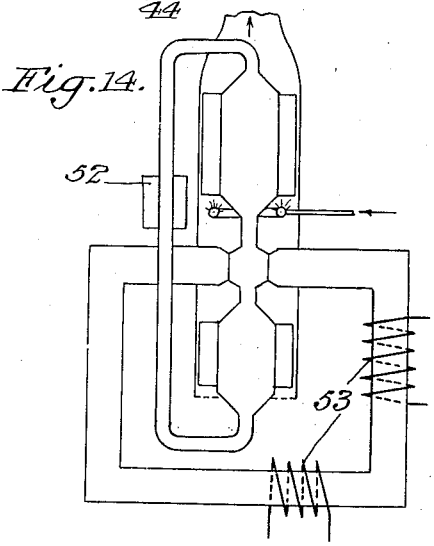
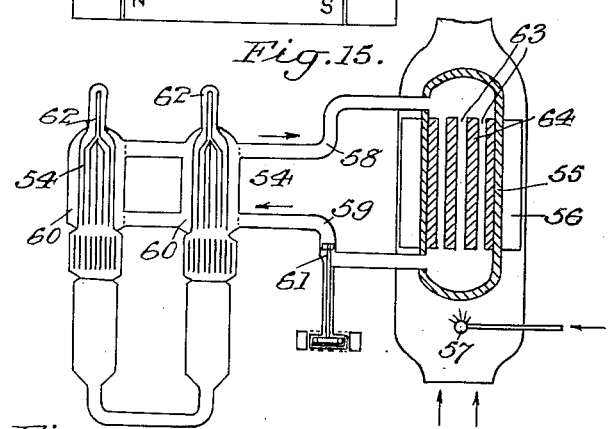
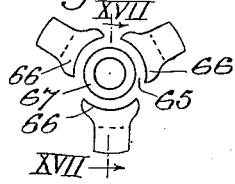
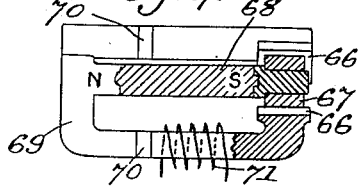

2,648,784

UNITED STATES PATENT OFFICE

2,648,784

METHOD AND APPARATUS FOR PRODUCING ELECTRICAL AND MECHANICAL ENERGY FROM THERMAL ENERGY

Constantin Chilowsky, New York, N. Y., assignor to Technical Assets, Inc., New York, N. Y., a corporation of Delaware Original application November 10, 1945, Serial No. 627,832. Divided and this application May 27, 1950, Serial No. 164,750

17 Claims. (Cl. 310—4)

This invention relates to a method and apparatus for producing electrical and mechanical energy from thermal energy.

This is a division of my application Serial No. 627,832 filed November 10, 1945, and now Patent No. 2,510,800 dated June 6, 1950.

It is known that paramagnetic bodies, and particularly the ferromagnetic bodies, such as iron, nickel, cobalt and certain special alloys (characterized by great magnetic permeability), keep the greater part of their magnetic properties up to a certain critical temperature, called the Curie point, and above this point become non-magnetic (or only slightly magnetic) on losing its permeability. The temperature of the Curie point for iron is 769° C., for nickel 360° C. and for cobalt 1137° C.

The present invention has for its object an improved method and apparatus for the transformation of thermal energy into mechanical, and particularly electrical energy, by utilizing the above explained phenomena, occurring in the neighborhood of the Curie point.

Most particularly, the invention envisages the direct transformation of heat into electrical energy without requiring—for the production of the electric current—a mechanical movement.

The invention also provides for a special mode of heating and cooling the ferromagnetic matter, through the intermediary of a metallic fluid in the form of molten or liquid metal or alloy, or in the form of metallic vapor. This mode of heating permits particularly to make this procedure compact and commercially practical. The heating and cooling of the system by means of a metallic fluid and particularly of a metallic liquid has, as will be shown hereinafter, a very great advantage.

According to the invention, the energy is transformed into alternating electric current in a static transformer. For that purpose, a closed magnetic circuit is provided, for instance in superimposed sheet-iron plates, as in an ordinary transformer. This closed magnetic ring includes one or more transverse sections or segments (consisting of the same or other ferromagnetic material) arranged in such a manner as to be able to be quickly heated and cooled by the passage of an appropriate fluid, now warmer, now colder, than the Curie point.

This rapid variation of the section's temperature, above and below the Curie point, produces a rapid variation of the magnetic resistance of the circuit.

By means of a winding, through which flows an electric current developing a magnetomotive force, an intense magnetic flux is induced in this iron ring. The periodic variation of the section's temperature above and below the Curie point, accompanied by the appearance and disappearance of its magnetic properties (permeability), causes the magnetic resistance of the ring and the magnetic flux flowing through it to vary periodically to a great extent. This induces a magnetomotive force and an alternating current in the winding of the ring. If necessary, a part of this electric current can be used to produce or to maintain the initial magnetic flux in the ring.

Preferably, however, the initial magnetic flux will be maintained in the ring by the use of a powerful permanent magnet. The two poles of such a magnet may be applied to symmetrical points of the magnetic ring, and the ring may have two transverse sections for the heating, located at two points of the ring, symmetrical in relation to the points of application of the poles of the magnet.

The two interrupter sections are alternatively heated and cooled, with a phase difference of time between them of 180°. The magnetic flux furnished by the permanent magnet, in branching off between the semicircles of the ring inversely to their relative magnetic resistances, will tend to concentrate itself in the circuit of least resistance, containing momentarily the section heated to a temperature below the Curie point. The magnetic flux will thus pass from one branch of the ring to the other, and return, with the frequency of the cycle of heating and cooling of the sections, thus producing in the windings of the ring a two-phase alternating current.

Thus a generator of alternating electric current is obtained, which is similar to existing transformers, but with the difference that in the usual transformer the variation of the magnetic flux is produced by a primary electric current, while in the new generator this variation of the flux is produced by the action of thermal energy, periodically varying or interrupting the flux.

It is evident that on the basis of these principles it will be possible to produce also three-phase or multi-phase currents.

The heating and cooling of the sections will be effected, preferably, by two or more parts of a fluid column oscillating in a closed fluid circuit, the "hot" (above the Curie point) and "cold" (below the Curie point) parts acting alternatively on the section or sections.

Although various fluids may be used, with varying efficiency, it appears that only the use of metallic liquids, and most particularly of alkaline metals (sodium, potassium, and their alloys and lithium) represents a practical industrial solution of the heating and cooling problem. For instance, the molten sodium, due to its high specific heat (about 0.3), its relatively great thermal conductivity, its small density (in the neighborhood of 1.0), its high boiling point (880° C.) and its chemical passivity in regard to iron and to nickel, permits transferring to, or removing from, the laminae of the interrupter section very great amounts of heat within a very short time with a minimum of thermal gradient and with a minimum of pressure necessary to move the fluid.

The interrupter sections consist generally of thin laminae of ferromagnetic substance (e. g., soft iron) arranged parallel to each other in the direction of the magnetic lines of force. The heating and cooling fluids pass between the laminae, preferably perpendicularly to the magnetic field. The thickness of the ferromagnetic laminae may vary between 0.1 mm. and 1 mm., and if necessary, up to the usual thickness of the sheet iron plates forming the magnetic core of the generator. Means are also provided for reducing the thickness of the laminae even below 0.1 mm.

The above described combination of heating and cooling by metallic liquids or fluids, with lamination of the ferromagnetic interrupter sections, insures the possibility of producing electric currents of industrial (commercial) frequency of 50 cycles and even more.

The produced alternating current may be utilized to insure and control the operation and automatic synchronization of the distributors, valves and other parts (or mechanisms) insuring the alternation of circulation of the cold, and hot, liquids between the laminae. But it is also provided that the desired frequency may be imposed by any mechanical or electric apparatus, possessing its own constant frequency of oscillation and that said apparatus will impose its frequency on the said distributors.

The invention also provides for the utilization of the same methods of lamination of ferromagnetic material and its alternative cooling and heating (particularly by means of metallic fluids), to transform heat into mechanical energy of movement and particularly of rotation.

Fig. 1 represents a vertical section of a typical form of generator;

Fig. 2 represents a horizontal section, taken on the line II—II of Fig. 1;

Fig. 3 represents a horizontal section, partly in plan, taken on the line III—III of Fig. 1;

Fig. 4 represents a vertical detail section of modified form of fluid heater;

Fig. 5 represents a vertical detail section, partly in elevation, of a form of fluid column oscillating means;

Fig. 6 represents a vertical detail section of a modified form of fluid column oscillating means;

Fig. 7 represents a vertical detail section of a thermally operated oscillating means;

Fig. 8 represents a vertical detail section of a modified form of the means shown in Fig. 7;

Figs. 9 and 10 represent vertical detail sections of other forms of said means;

Fig. 11 represents a vertical detail section of an oscillation frequencer regulator;

Fig. 12 represents a detail modification of the interrupter section;

Figs. 13 and 14 represent vertical sections, partly in elevation, of generators having a single transverse interrupter section;

Fig. 15 represents a vertical section of a generator in which the primary heating and cooling liquid is heated by circulation of a secondary heating liquid;

Fig. 16 represents a detail elevation of the rotor end of a thermomagnetic motor, and Fig. 17 represents a longitudinal section on the line XVII—XVII of Fig. 16.

It will be understood that the drawings are largely diagrammatic and do not purport to show all conventional structural details.

Figs. 1, 2 and 3 show a form of generator in which the heating and cooling are effected by the oscillation of a simple column of metallic liquid having heated and cooled parts. The ferromagnetic armature comprises symmetrical parts 1, 2, shown as generally U-shaped, and having their ends connected by transverse sections 3, 4, made up of slightly spaced parallel thin laminae of ferromagnetic material set in magnetic material supports 5 and enclosed by non-magnetic covers 6. The sections 3, 4 are open on two faces for the circulation of the heating and cooling fluid through the circuit shown in Fig. 1. In this figure a heater 7 for fluid from the section 3 is shown as a block of heat-conductive metal traversed vertically by narrow channels 8 and provided with fins 9 for picking up heat from burners 10, to which gas or the like fuel is supplied from a source not shown. A similar heater 11 is provided for fluid from the section 4, and coolers 12, 13 (similar in construction to the heaters) are also provided for cooling, respectively, the liquid traversing the sections 3 and 4.

The liquid circuit is continuous, the upper ends of the heaters being connected by a conduit 14 and the lower ends of the coolers being connected by a conduit 15. Means for oscillating the liquid column is indicated diagrammatically at 16 and it will be noted that this is in the cool part of the apparatus with obvious advantages resulting from such location. When the liquid column is oscillated by the means 16, hot liquid is drawn down from one heater to its corresponding laminar section 3 or 4 while cooling liquid is simultaneously passed up from the opposite cooler to the other section, and vice versa with a frequency of heating and cooling corresponding to the frequency of oscillation, the hot liquids being maintained always above the Curie point of the laminae and the cooling liquids being below that point, with sufficient margins to ensure efficient operation.

Fig. 4 represents a modified form of heater comprising a large chamber 17 having external fins 18 which may be heated by products of combustion from a burner (as in Fig. 1) and internal fins 19 which transmit the heat to the liquid. Efficient circulation of the liquid in the chamber can be ensured by shaping its connections to upper and lower conduits as shown, the lower connection being angular while the upper connection is smoothly conical; oscillation of the fluid through the chamber will cause eddies (indicated by the arrows) and result in thorough heating of the fluid. Such heaters may be used, for instance, in place of the heaters 7 and 11 of Fig. 1.

Details of a liquid column oscillator (16 in Fig. 1) are shown in Fig. 5. A piston or plunger 20 of magnetic material is fitted freely in the conduit 15 between springs 21, the outer ends of which may be retained by rings 22. The bifurcated armature 23 of an electro-magnet, polarized by the application of the poles of a permanent magnet, is provided with windings 24 through which alternating current may be passed, the piston 20 being thus oscillated with the frequency of reversal of the current. The natural frequency of the spring-piston-liquid column assembly should be considered in order to obtain the best results.

Another form of oscillator is shown in Fig. 6 where a piston 25 is arranged to be reciprocated by the eccentric 26 on the shaft of a motor 27.

Fig. 7 shows an arrangement in which the liquid column is oscillated by thermal energy resulting from rapidly alternating formation and condensation of metallic vapor at two closed upper ends of the column. In this case the liquid channels 28, 29 in a pair of heaters (such as heaters 7, 10 of Fig. 1) terminate above the heaters in tubes 30, 31 of relatively small cross-section with their upper ends sealed. These tubes are formed in heat-conductive heads 32, 33 provided with fins 34 which project into the stream of heated gas flowing up from the fins of the heaters. When the ratio of the heat-exchanging surfaces of the fins 34 and heads 32, 33 to the volume of liquid metal in the tubes 30, 31 is sufficiently large (and greater than the corresponding ratio in the heaters) the liquid in the tubes 30, 31 will be vaporized. If necessary, however, the super-heating of the heads 32, 33 may be assured by the provision of an additional burner 35, with its own gas supply through the pipe 36, as shown in Fig. 8.

In the apparatus shown in Figs. 7 and 8, it is assumed that the liquid metal column does not completely fill the closed system in which it is contained, and that said system is evacuated. When oscillation has been initiated in any suitable manner by forcing the liquid at one end of the column to rise into the tubes 30 or 31, the liquid in said tubes will immediately be vaporized and the vapor pressure will forcefully move the column through the heaters and coolers until its other end penetrates into the other super-heating tubes, when the operation will be repeated in the opposite direction. The metallic vapor will be condensed when it passes out of the tubes and so will be in condition to be vaporized again on the following cycle. Oscillation of the column with any desired frequency, depending on the speed of vaporization, can thus be maintained automatically without the use of any moving mechanical parts.

Modified forms of super-heating tubes are shown in Figs. 9 and 10. In Fig. 9 the small tube 37 is shown as being surrounded by an electric resistance coil 38. In Fig. 10 the upper end 39 of the head is insulated from the lower part of the head by a body of refractory insulating material 40, and vaporization of the liquid metal in the tube is effected by electrical discharge through said metal between the parts of the head.

Fig. 11 shows a form of frequency regulator which may be introduced into the lower part of the liquid column. A sliding piston 41 is mounted in the liquid conduit and attached to springs 42, the tension and natural frequency of which may be regulated as by the screws 43. It will be understood that an electro-magnetic oscillator of the type shown in Fig. 5 could also be used with the arrangement shown in Figs. 7 and 8.

The laminae in the transverse interrupter sections may be reinforced in various ways as by the provision of a middle layer of tungsten or tantalum, for instance, (having high strength even at elevated temperatures) between adherent surface layers of iron, or by the provision of reinforcing spacers 44 connecting the laminae and extending in the direction of flow of the heating and cooling fluids, as shown in Fig. 12.

In the apparatus described above it is preferable to use metallic liquids as the heating and cooling fluids, because of the high specific heat and conductivity of such liquids.

In the above described cases of utilization of a permanent magnet, advantage was taken of the possibility of obtaining powerful magnetic fluxes and high magnetic fields.

But it is also possible to use, instead of a permanent magnet, a core of soft iron with windings, suitably traversed by the currents, conveniently rectified, produced by thermal interruption of the magnetic flux. It is also provided to use two separate armatures, dephased by 180°, the currents of one of the armatures, suitably dephased, acting on the magnetic flux of the other, and vice versa.

It is also possible to obtain three phase currents by using armatures with three branches and three dephased interruptions with 120° electrical angle therebetween, or three separate armatures. Other multi-phase currents could be obtained in a similar manner, as will readily be understood. For starting, the residual magnetism or a flux produced by an auxiliary starting current may be used.

It is also possible, as shown in Figs. 13 and 14, to use generators with a single interrupter section in a single armature, with or without a permanent magnet. In Fig. 13 there is an oscillating metallic liquid column maintained in oscillation by superheaters 45, 46 such as that shown in Fig. 9, one branch of the column being arranged to pass through a heater 47, cooler 48 and laminar interrupter section 49 of the armature 50. Fins 51 are provided for cooling and condensing the metallic vapors formed in the superheater 45.

Fig. 14 shows a similar arrangement (for instance, without permanent magnet) in which the column of metallic liquid (in a closed circuit) is oscillated by an oscillator 52 similar to the one shown in Fig. 5 or 6. Windings 53 are provided for the dephased current.

In the forms of generators hereinabove described the fluid heaters, whether with continuous circulation or with oscillation of the metallic liquid column, were directly heated by the flame or products of combustion, with the inconvenient encumberance of the several conduits in proximity to the heated laminations and the armature. The electric control of the temperature by regulating the fuel also presents difficulties due to the inertia.

In an important modification shown schematically in Fig. 15, the heaters for the liquid in circulation or in oscillation across the laminations, are heated not directly by the products of combustion but by circulation of a secondary metallic liquid in a separate circuit which includes channels in the heater or heaters, and channels in another separate reheater, called a secondary reheater. It is heated directly by the flame or by the products of combustion and can be larger, with a greater heating surface of a higher thermal output, but it does not encumber the generator itself, being connected with the primary heater or heaters by tubes with suitable thermal insulation.

Because of the rapidity of the transmission of heat in the primary heater from the secondary liquid to the primary liquid, through a wall which can be made relatively thin, the automatic temperature control of the primary liquid can be more accurate and more rapid. Actually, the control element can act, in the first place and with a rapid result, on the velocity of circulation of the secondary liquid; the temperature of the secondary liquid being capable to be controlled, with a less rapid phase, by the action of the combustion.

The same arrangement can be applied, if desired, also to the "cold" liquid. The cooling of the cold circuit can, however, be largely assured by simple thermic radiation.

In Fig. 15, 54, 54 are primary heaters for the oscillating liquid column, and 55 is a secondary reheater with fins 56, heated by the products of combustion of a burner 57. Tubes 58, 59 are provided for the closed circulation of the secondary liquid between the secondary reheater and the two primary heaters 54 which have channels or jackets 60 for passage of the secondary fluid. A propeller 61 assures the circulation of the secondary liquid and devices for assuring the oscillation of the primary circuit are indicated at 62. The secondary liquid is heated in the tubes 63 in the block 64.

If desired, this secondary circulation can be maintained by thermal syphoning. In such a case, the direction of the circulation could be reversed and the metal in the tubes 63 of the secondary reheater, circulating from the bottom to the top, could be heated to a more or less pronounced boiling.

The circulation of the metallic liquid in the secondary circuit can also take place, if desired, in the form of an oscillation, generally slower and with the volume of the displacement of the liquid being more or less equal to, or greater than, the total volumes of the two conduits and of the capacity of the primary heater or heaters.

As was indicated above, the generator can be made for a multiphase current, for instance, as a three-phase generator, using an armature with three branches, with three branches of the flux interruption, dephased by 120° between interruptions. But it is also provided to use such a system, for instance, with three interruptions, mutually dephased by 120°, for forming a magnetic rotary field, capable of entraining rotors, and also to construct electric motors, of a polyphase "thermomagnetic" type, particularly three phase.

For this purpose, in an armature of the described type with several branches, and having in each branch an interrupter section for modulating the magnetic flux with a definite frequency, a cut or space is made in each branch to provide room for placing in these spaces or recesses, and notably in the magnetic variable field thereof, the movable elements of the rotor. These cuts or spaces, forming the rotor magnetic field, will be also, in each branch, in series with the interrupter sections.

The channels of heating should be located at points in the armature branches sufficiently distant from the rotor, and this is very important, in order that the rotor and the plates of the magnetic flux in which it rotates, can be maintained at a sufficiently low temperature for an element of rotation.

The rotor should be constructed according to the particular type of the motor—synchronous, asynchronous, or other type—which may be desired and suitable for operation in a variable magnetic field.

Figs. 16 and 17 show a schematic end elevation and a corresponding longitudinal section, of a three-phase thermomagnetic motor with rotating field.

In Fig. 16, 65 is a circular section of a rotary magnetic field. 66, 66, 66 are plates constituting three poles of the rotating field. In this case of the utilization of a permanent magnet, central or axial (polarized motor), these three plates represent the same polarity (for instance, north) but of variable intensity. 67 is a piece of soft iron with the opposite polarity (for instance, south).

In Fig. 17, 68 is an axial permanent magnet. 69 is one of the three branches of the magnetic armature. 70, 70 are thermal interrupters of the magnetic flux, with heated iron laminations, alternately cooled, with dephasing of 120°. (Arrangements for heating are not shown, having already been described in detail.) 71 is a winding whose electric current can be used in the rotor. The rotor, entrained by the rotary field of the gap 65, is not shown on the drawing. It can be arranged according to the type of the motor.

If desired, the part 67 can be movable and can, by itself, constitute a rotor. If desired, instead of the permanent magnet 68, the magnetic flux can be produced by the current in the windings 71, acting on the different branches with suitable dephasing.

The oscillation of the three columns of the liquid metal, heating and cooling the laminations of the three sections 70, can be assured, for instance, by three pistons with dephased action and magnetic winding, placed in the space under the junction of the three columns. This entrainment can be also effected by three dephased oscillators, with gas or vapor, described above, placed on the upper ends of the three columns, these columns having their cool lower ends joined in a common junction.

In the case of use of armatures polarized by application of a permanent magnet (for instance, Fig. 3) with bifurcation of the magnetic flux between different branches of the armature, the interruption of the magnetic flux in the branches dephased by 180°, will induce in the respective windings two alternating induction currents, equally dephased by 180°. It is possible to replace the permanent magnet by an electromagnet, the magnetic flux of which is maintained by superposition of currents produced in the two branches, and suitably rectified and oriented.

It is also possible to use unpolarized armatures, and to produce alternating current by two separate armatures, with only one transverse section for flux interruption in each, the current produced in one of these armatures, conveniently oriented and dephased, acting on the other, and vice versa, so as to maintain in these two armatures conveniently dephased and oriented variations of the magnetic flux, capable of varying in intensity and in direction. In the case when the magnetic flux is varying in direction, the thermic interruption of the flux will take place at each half-period of produced current.

An alternating current can also be produced by a generator with only one armature having only one interrupter section, the current induced by one flux interruption being used to produce a conveniently dephased current which will produce in the same armature a dephased magnetic flux of inverse direction, and so on. Such a dephased current can be obtained either by use of transformers, or by resonance oscillation, or other known means.

In general, means are provided by using several branches of armature, or several separate, but electrically interconnected, armatures, to transform thermic energy into known types of electric current. In conformity with the required current, these interconnections can be direct, or suitably dephased by suitable dephasing means, as transformers, self-induction, capacity, resonance oscillation, etc.

Where mention is made herein of heating the interrupter section or laminae thereof to temperatures "above the Curie point" it refers to high magnetic fields. It will be understood that, at low magnetic field, heating to said point is all that is required in order to obtain the desired effects.

It has been noted that the several ferromagnetic metals iron, nickel and cobalt have different Curie points. Advantage may be taken of this fact by using different material in a series of two or more interrupter sections, with an arrangement of fluid circuits such that the heat removed by a cooling fluid from the section having the highest Curie point is used (with modification, if necessary) for heating the section with next lower Curie point, thus effecting a saving of thermal energy. This arrangement is developed more fully in copending application Serial No. 635,980, filed December 19, 1945, now Patent No. 2,510,801.

It will be understood that various changes may be made in the arrangement, form and construction of the several parts without departing from the spirit and scope of my invention and hence I do not intend to be limited to the details herein shown and described except as they may be included in the claims.

What I claim is:

1. The method of producing electrical and mechanical energy from thermal energy by producing a magnetic flux in a closed armature of ferro-magnetic material, alternately heating and cooling a transverse section of said armature above and below the Curie point of said material, whereby the permeability of said armature is interrupted and said magnetic flux is modulated in intensity, thereby inducing in a winding of said armature an alternating electric current, in which the alternate heating and cooling of the transverse section is effected by the periodical oscillation, with the desired frequency, of a metallic liquid column alternately traversing in opposite directions the transverse section, parts of this column on one side of the transverse section being continuously heated, and parts of the same column on the other side of the transverse section being continuously cooled, said parts being brought alternately into heat-exchange relation with said section.

2. The method according to claim 1 which includes displacing part of said column alternately between said section and a heater, and displacing part of said column alternately between said section and a cooler.

3. The method according to claim 1 in which the heating of the transverse section is effected by supplying thereto parts of the metallic liquid column at a temperature above the Curie point, and the cooling of the section is effected by supplying thereto parts of the metallic liquid column at a temperature below the Curie point.

4. The method according to claim 1 in which the metallic liquid is selected from the group of alkali metals and alloys thereof.

5. The method according to claim 1 in which the metallic liquid is sodium, potassium or alloys thereof.

6. The method according to claim 1 which includes maintaining said oscillation of the column by alternately vaporizing and condensing the metallic liquid at the ends of the column.

7. A generator of the character described comprising, a closed armature of ferromagnetic material, means for producing a magnetic flux in said armature, a winding on said armature, and means for varying the temperature of a transverse section of said armature alternately above and below the Curie point of the material of said section, whereby the magnetic permeability of the section is alternately interrupted and restored and said flux is modulated in intensity to effect the induction of electric current in said winding, the temperature varying means including, a fluid circuit containing a column of metallic liquid, means for heating the liquid in said circuit on one side of the transverse section, means for cooling the liquid in said circuit on the other side of said section, and means for oscillating the column to bring hot ond cold parts thereof alternately into heat-exchange relation with said transverse section.

8. A generator of the character described comprising, a closed symmetrical armature of ferromagnetic material, means for producing a magnetic flux in said armature, a winding on said armature, and means for varying the temperature of a plurality of symmetrically disposed transverse sections of said armature alternately above and below the Curie point of the material of said sections, whereby the magnetic permeability of the sections is alternately interrupted and restored and said flux is modulated in intensity to effect the induction of electric current in said winding, the temperature varying means including, a fluid circuit containing a column of metallic liquid, means for heating the liquid in said circuit on one side of each transverse section, means for cooling the liquid in said circuit on the other side of said section, and means for oscillating the column to bring hot and cold parts thereof alternately into heat-exchange relation with said transverse sections.

9. A generator according to claim 8 in which the fluid circuit is closed, and in which the oscillating means is an electromagnetically operated piston.

10. A generator according to claim 8 in which the fluid circuit has hermetically closed ends, and in which the oscillating means includes superheating means for said fluid at said ends.

11. A generator according to claim 10 in which the superheating means is electrical.

12. A generator according to claim 11 which includes means for actuating alternately the superheating means at said ends.

13. In a generator of the character described, a hermetically sealed fluid container of extended length and having its ends of reduced cross-section, a mobile column of metallic liquid in said container, means associated with the ends of the container for vaporizing portions of said liquid in said ends, and means for operating the vaporizing means at opposite ends of the container alternately to oscillate the column of liquid.

14. In a generator according to claim 13, vaporizing means comprising heaters adapted to raise the temperature of the container ends above the boiling point of the liquid.

15. In a generator according to claim 13, vaporizing means adapted to cause the passage of electricity alternately through the metallic fluid in the ends of the container.

16. The method of varying the temperature of a section of magnetic material in an armature traversed by a magnetic flux which includes, passing masses of metallic liquid at different temperatures alternately in heat-exchange relation with the material of said section.

17. The method according to claim 16 in which the metallic liquid is sodium, potassium or a sodium-potassium alloy.

CONSTANTIN CHILOWSKY.

References Cited in the file of this patent

UNITED STATES PATENTS

| Number | Name | Date |
| --- | --- | --- |
| 1,406,576 | Murray | Feb. 14, 1922 |
| 2,016,100 | Schwarzkopf | Oct. 1, 1935 |
| 2,510,800 | Chilowsky | June 6, 1950 |